United States Patent

Furumura et al.

[11] Patent Number: 5,427,457
[45] Date of Patent: Jun. 27, 1995

[54] ROLLING BEARING

[75] Inventors: Kyozaburo Furumura; Yasuo Murakami; Nobuaki Mitamura; Shinichi Shirota; Shigeru Okita; Kazuo Sekino, all of Kanagawa, Japan

[73] Assignee: NSK Ltd., Japan

[21] Appl. No.: 134,588

[22] Filed: Oct. 12, 1993

Related U.S. Application Data

[63] Continuation-in-part of Ser. No. 915,503, Jul. 20, 1992, abandoned.

[30] Foreign Application Priority Data

Jul. 18, 1991 [JP] Japan .................. 3-178191
Oct. 13, 1992 [JP] Japan .................. 4-274465

[51] Int. Cl.$^6$ ............................................. F16C 19/00
[52] U.S. Cl. ................................ 384/450; 384/492; 384/565; 384/569; 384/912; 384/913
[58] Field of Search ............... 384/450, 492, 565, 569, 384/912, 913

[56] References Cited

U.S. PATENT DOCUMENTS 4,904,094 2/1990 Furumura et al. .
5,137,375 8/1992 Murakami et al. .

FOREIGN PATENT DOCUMENTS 4194415 7/1992 Japan .
2244103 11/1991 United Kingdom .

Primary Examiner—Lenard A. Footland
Attorney, Agent, or Firm—Sughrue, Mion, Zinn, Macpeak & Seas

[57] ABSTRACT

An object of this invention is to provide a rolling bearing in which, as for the rolling elements, it is unnecessary to employ a high level heat treatment such as carburizing or carbonitriding which requires a long period of time to achieve, and which is sufficiently long in service life even when used with a lubricant containing foreign matters. In a rolling bearing, the amount of residual austenite ($\gamma_R$ vol %) in the surface layer of at least one of the inner and outer races is in a range of 25 to 40 vol %, and the surface hardness (Hv) thereof meets the following condition:

$$-4.7 \times (\gamma_R \text{ vol \%}) + 900 \leq Hv \leq -4.7 \times (\gamma_R \text{ vol \%}) + 1000$$

and the hardness of the rolling elements combined with the inner and outer races is higher by $H_RC$ 1 to 2 than that of the one of the inner and outer races.

8 Claims, 2 Drawing Sheets

ROLLING BEARING

This is a Continuation-in-Part of Application No. 07/915,503 filed Jul. 20, 1992, abandoned.

BACKGROUND OF THE INVENTION

1. Field of Industrial Utility

The present invention relates to a rolling bearing, more particularly to the improvement of the life of rolling bearings that are to be used in transmissions, engines, etc., of automobiles, agricultural machines, construction machines, as well as iron- and steel-making machines.

The present invention further relates to rolling bearings, and more particularly to an improvement in service life of rolling bearings which are used, for instance, in the transmissions or engines of automobiles, agricultural machines, constructing machines or iron and steel machines.

2. Prior Art

It is well known that foreign materials such as metal cuttings, shavings, burrs and worn particles that get into lubricants for rolling bearings will damage their races and rollers, thereby causing a substantial reduction in their service life. Under the circumstances, the assignee previously filed U.S. Pat. No. 4,904,094, in which they proposed the following: if the contents of carbon, residual austenite and carbonitrides in the rolling surface layer of a rolling bearing are specified to appropriate levels, the stress concentration that will develop at edges of indentation due to a foreign material present in the lubricant for the bearing can be reduced and the occurrence of cracking can also be suppressed to improve the life of the bearing. According to this proposal, the life of the rolling bearing under lubrication in the presence of a foreign material can be improved by insuring that residual austenite will be present in an appropriate amount. On the other hand, the proposal involves the disadvantage that the residual austenite lowers the surface hardness of the bearing, thereby reducing its fatigue resistance. In addition, the proposal did not take into account the effects on the bearing's life of the particle size of carbides and carbonitrides; in particular, large-size carbides, if they are subjected to cyclic stress, will be the start point of fatigue, leading to the occurrence of cracking and flaking but this possibility was not considered by the above noted proposal.

However, one of the factors which shorten the service life of a rolling bearing is foreign matter mixed with the bearing lubricant. It is well known in the art that metal chips, shavings, burrs and/or powder are often mixed with the bearing lubricant. If the rolling bearing is used with the bearing lubricant containing such foreign matter, then the foreign matter may damage the track rings, namely, the inner and outer races, and the rolling elements of the bearing, thus reducing the service life of the latter. At worst, the service life is reduced to 1/10 of that which the rolling bearing has when the bearing lubricant contains no foreign matter.

In order to overcome this difficulty, the present Applicant has proposed a rolling bearing under U.S. Pat. No. 5,137,375. In the rolling bearing, the relationships between the amount of residual austenite ($\gamma_R$ vol %) and the hardness (Hv) of the surface layer of the rolling bearing are suitably determined that, even when a rolling bearing is used with the bearing lubricant containing foreign matter, concentration of stress at the edges of indentations formed by the foreign matter is lessened, and therefore the bearing is prevented from being cracked. That is, the rolling bearing is improved in service life.

The relationship of hardness between the track rings and the rolling elements of a rolling bearing have been disclosed by E.V.ZARETSKEY "A study of residual stress in during rolling", transactions of the ASME, April 1969. That is, it has been known in the art that the service life of a rolling bearing is increased when the hardness of the rolling elements is made higher by $H_RC$ 1 to 2 (in a C-scale of Rockwell Hardness) than that of the track rings, because residual compressive stress is produced as the rolling elements roll.

The rolling bearing disclosed by the aforementioned U.S. Pat. No. 5,137,375 suffers from the following problems or difficulties: In the rolling bearing, the amounts of residual austenite ($\gamma_R$ vol %) of the rolling surface layers of the track rings and the rolling elements are set in a range of 25 to 40 vol % by carburizing or carbonitriding them. In particular, as for the rolling elements, it is necessary to employed a high level heat treatment.

In addition, in order to suitably determine the relationships between the amount of residual austenite ($\gamma_R$ vol %) and the hardness (Hv), it is necessary to use a special heat treatment technique, which takes a long period of time to achieve the heat. Hence, the rolling bearing is low in productivity.

The conventional rolling bearing, in which the hardness of the rolling elements is made higher by $H_RC$ 1 to 2 than that of the track rings, has been proposed for the purpose of increasing the service life with the lubricant containing no foreign matters. That is, in the case of the conventional rolling bearing, no attention is paid to increasing the service life when it is used with the lubricant containing foreign matter.

SUMMARY OF THE INVENTION

The present invention has been accomplished under these circumstances.

An optimal relationship between the content of residual austenite in the rolling surface layer and its hardness is investigated and found. Further, the average particle sizes of carbides and carbonitrides in the rolling surface layer is adjusted to optimal values to provide a rolling bearing that had a longer life than the prior art products not only under lubrication in the presence of foreign materials but also under lubrication in clean conditions.

The bearing proposed as a first aspect of the present invention is characterized in that at least one of the races and the rollers is made of an alloy steel that contains carbide forming elements, that has a residual austenite content ($\gamma_R$) of 20–45 vol % in the rolling surface layer and that is dispersion strengthened by fine-grained carbides or carbonitrides having an average particle size of 0.5–1.5 μm to insure that the rolling surface will have the following Vickers hardness ($H_V$) in relation to the residual austenite content:

$$-4.7 \times (\gamma_R \text{ vol \%}) + 920 \leq H_V \leq 4.7 \times (\gamma_R \text{ vol \%}) + 1,020$$

where the average particle size of carbides is defined by a following equation:

$$(\text{a maximum particle size} + \text{a minimum particle size}) \times \tfrac{1}{2}$$

However, this rolling bearing has had the problem that it is difficult to insure the formation of fine-grained carbides or carbonitrides having an average particle size of 0.5–1.5 μm and the case has often occurred where a large-size proeutectic carbide forms locally in the surface layer, leading to a partial failure in extending the life of the bearing.

A second aspect of the present invention has been accomplished under these circumstances and has as an object providing a rolling bearing that is characterized in that fine-grained carbides and carbonitrides can be consistently formed in the actual production and that the intended amount of residual austenite and hardness can be achieved to insure a further improvement in the life of the bearing.

This object of the present invention can be attained by a rolling bearing that comprises races and rollers, at least one of which is made of an alloy steel that has a residual austenite content ($\gamma_R$) of 20–45 vol % and which contains 1–3 wt % Cr, 0.1–1.2 wt % C and Mo in an amount ranging from one third of the Cr addition to 2.0 wt %, with the carburized or carbonitrided rolling surface having the following range of Vickers hardness ($H_V$) in relation to the residual austenite content:

$$-4.7\times(\gamma_R \text{ vol }\%)+920\leqq H_V\leqq 4.7\times(\gamma_R \text{ vol }\%)+1{,}020$$

In addition, an object of the third aspect of the invention is to eliminate the above-described difficulties accompanying a conventional rolling bearing. More specifically, an object of the invention is to provide a rolling bearing in which, as for the rolling elements, it is unnecessary to employ a high level heat treatment such as carburizing or carbonitriding which requires a long period of time to achieve, and which is sufficiently long in service life even when used with a lubricant containing foreign matter.

The foregoing object of the invention has been achieved by the provision of a rolling bearing comprising track rings, namely, inner and outer races, and rolling elements set between the inner and outer races, in which, according to the invention the amount of residual austenite ($\gamma_R$ vol %) in the surface layer of at least one of the inner and outer races is in a range of 25 to 40 vol %, and the surface hardness ($H_V$) thereof meets the following condition:

$$-4.7\times(\gamma_R \text{ vol }\%)+900\leqq H_V\leqq -4.7\times(\gamma_R \text{ vol }\%)+1000$$

and the hardness of the rolling elements combined with the inner and outer races is higher by $H_RC$ 1 to 2 (in a C-scale of Rockwell Hardness converted from the Vickers Hardness (Hv)) than that of at least the one of the inner and outer races.

In addition, in the present invention, the rolling elements may be made of a high-carbon chromium steel.

In the rolling bearing of the invention, the amount of residual austenite ($\gamma_R$ vol %) in the surface layer of at least one of the inner and outer races is in a range of 25 to 40 vol %, and the surface hardness (Hv) thereof meets the following condition:

$$-4.7\times(\gamma_R \text{ vol }\%)+900\leqq H_V\leqq -4.7\times(\gamma_R \text{ vol }\%)+1000$$

and the hardness of the rolling elements combined with the inner and outer races is higher by $H_RC$ 1 to 2 than that of the one of the inner and outer races. Hence, as for the rolling elements, it is unnecessary to employ a high level of heat treatment such as carburizing or carbonitriding which requires a long period of time to achieve. The rolling elements are sufficiently long in service life even when used with a lubricant containing foreign matter.

The reasons for these features will be described in detail.

It is well known in the art that foreign matter mixed in the lubricant forms indentations in the rolling surface layer. Cracks which reduce the service life of the rolling bearing are liable to be formed at the edges of the indentations. The cracks are related closely to the amount of austenite residual in the rolling surface layer. The residual austenite is normally soft and viscous depending on the content of carbon in the material. Therefore, if the residual austenite is present in a predetermined rate in the rolling surface, then concentration of stress at the edges of the indentations can be lessened; that is, the formation of cracks there can be suppressed.

On the other hand, when the frequency of relative passage of the member which passes over the indentations during rolling (for instance the track rings with respect to the rolling elements) exceeds a predetermined value, then the residual austenite in the rolling surface layer is transformed into martensite by deformation energy applied to the rolling surface layer, so that the rolling surface layer is hardened. Thus, the service life of the rolling bearing is increased.

In order to utilize those two characteristics optimumly, the amount of residual austenite ($\gamma_R$ vol %) in the rolling surface layer should be set to 20 to 45 vol %, preferably 25 to 40 vol %.

If the amount of residual austenite ($\gamma_R$ vol %) is smaller than 20 vol %, it is difficult to sufficiently lessen the concentration of stress at the edges of the indentations. If, on the other hand, the amount of residual austenite ($\gamma_R$ vol exceeds 45 vol %, then the effect of lessening the concentration of stress is saturated, and the hardness of the rolling surface layer is decreased; that is, the fatigue resistance is lowered (U.S. Pat. No. 5,137,375).

It is known in the art that, in the case where the rolling bearing is used with the lubricant containing foreign matters, the highest in durability of its components is the inner race, the next highest component is the rolling element, and the outer race comes last, and therefore, in order to increase the service life of the rolling bearing, it is essential to increase the service life of the inner race. Hence, in the invention, the amount of residual austenite ($\gamma_R$ vol %) in the rolling surface layer of the inner race or in the rolling surface layers of the inner race and the outer race is set in a range of 25 to 40 vol %.

In the invention, the term "surface layer" as used herein is intended to mean a layer having a predetermined depth from the surface, the depth being, for instance, 2% of the average diameter of the rolling elements where the shearing stress is maximum.

Another factor for determining the service life of the rolling bearing is the hardness (Hv) of the rolling surface layer. In the invention, the rolling surface layer of the inner race, or the rolling surfaces of the inner race and the outer race have a hardness ($H_V$) which satisfies the following condition:

$$-4.7 \times (\gamma_R \text{ vol }\%) + 900 \leq Hv \leq -4.7 \times (\gamma_R \text{ vol }\%) + 1000$$

The condition is determined as follows: If the hardness (Hv) of the rolling surface layer is smaller than the lower limit of the above-described condition, then the fatigue resistance is decreased, and the service life of the rolling bearing is short irrespective of the lubricant (that is, it is short even when the lubricant contains no foreign matters). It is difficult to make the hardness (Hv) larger than the upper limit.

Furthermore, in the invention, the hardness of the rolling elements is made suitable for the inner race or the inner race and the outer race which have the above-described most suitable amount of residual austenite ($\gamma_R$ vol %) and hardness (Hv). Hence, by combining the rolling elements with the inner race or the inner race and the outer race, formation of indentations in the rolling surfaces of the rolling elements which is due to the foreign matter in the lubricant being nipped can be lessened.

If the difference between the hardness of the rolling elements and the hardness of the inner race or the inner race and the outer race {(the hardness of the rolling element) − (the hardness of the inner race or the inner race and the outer race)} is smaller than $\Delta H_RC$ 1, then the resultant indentations are large in diameter. The concentration of stress at the edge of the indentation is closely related to the ratio (r/c) of the curvature (r) of the edge (FIG. 2) to the radius (c) of the indentation. That is, it is known in the art that the concentration of stress at the edge of the indentation is lessened as the ratio r/c increases (Japanese Patent Application (OPI) No. 55432/1989).

The aforementioned value (r) is proportional to the amount of residual austenite ($\gamma_R$ vol %). Therefore, in the case where the amount of residual austenite ($\gamma_R$ vol %) is the same, the ratio r/c is increased as the value c decreases. Hence, in order to lessen the concentration of stress at the edge of the indentation, the diameter of the indentation should be decreased as much as possible. Therefore, in the invention, the hardness of the rolling elements combined with the inner race or the inner race and the outer race is made higher by at least $H_RC$ 1 than the hardness of the inner race or the outer race. If the hardness of the rolling elements is made higher by $H_RC$ 3 or more than that of the inner race or the outer race, then the inner race or the outer race suffers from flaking. Therefore, the upper limit is set to $H_RC$ 2.

DETAILED DESCRIPTION OF THE PREFERRED EMBODIMENTS

Figure 1:
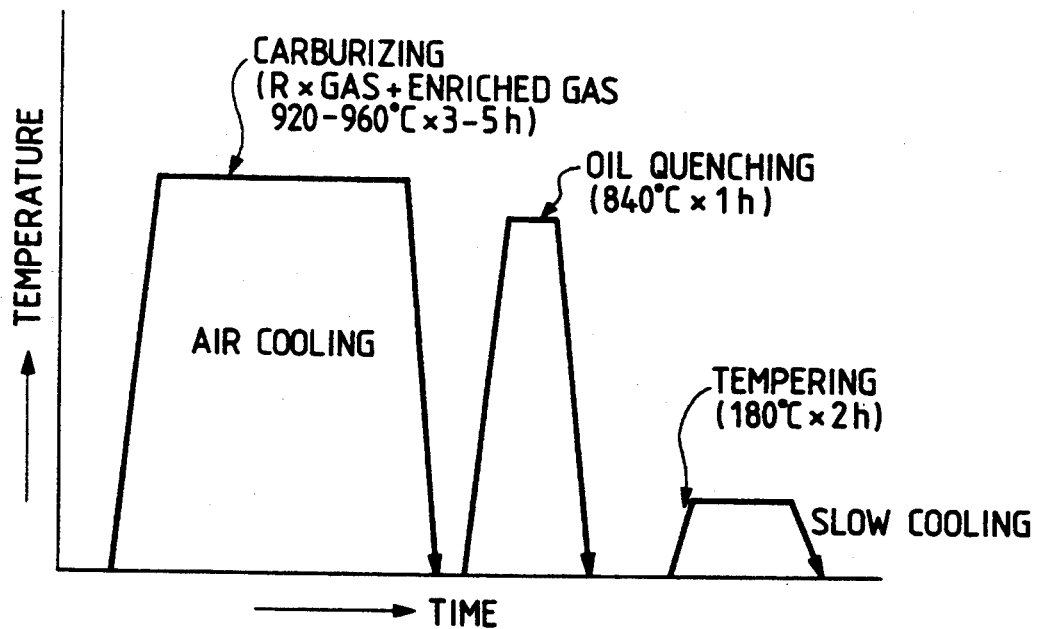
FIG. 1 is a diagram showing the sequence of steps for producing the rolling bearing of the present invention, together with the conditions of heat treatments for carburization.

The present invention has been accomplished on the basis of the finding of the unique effect the addition of Mo has not only on the particle size, amount and hardness of carbides or carbonitrides that form as a result of carburizing or carbonitriding 1-3 % Cr containing steels but also on their residual austenite content.

Stated more specifically, the present inventors conducted intensive studies on a method for refining the carbide precipitate which would compensate for the decrease in surface hardness due to the presence of residual austenite. As a result, they found that the size of the grains or particles of the carbide precipitate could be reduced by adding Mo in an amount controlled relative to the Cr addition (this may be called the "carbide refining effect" of Mo). The carbide composition of steel to which Cr and Mo are added simultaneously has not yet been completely identified; however, one may safely assume that as the amount of Mo increases relative to Cr, the carbide composition will shift from a cementite-base carbide ($M_3C$) to an $M_{23}C_6$-base alloy carbide. It is known that the precipitated particles of cementite tend to grow faster than other alloy carbides in the $\gamma$ phase during carburization or carbonitridation; hence, one may safely assume that the above-mentioned "carbide refining effect" of Mo is due to the accelerated refining of the precipitated carbide that occurs as a result of the cementite-base carbide having changed to another type of carbide. The refining of the carbide leads to the reduction of maximum particle size and, hence, to the suppression of the formation of a macrocarbide which tends to serve as the start point of cracking; this would probably be a cause of the success of the present invention in appreciably extending the life of a rolling bearing.

It was established experimentally that carbides tended to become more refined in carbonitriding than in carburization. This would derive from the following two facts: carbonitrides (e.g., $Fe_3(CN)$ and $Cr_2N$) are more readily refined than carbides; and the temperature for carbonitriding is lower than that for carburization. In view of these facts, one may well say that carbonitridation is more desirable than carburization for the purpose of realizing consistent production of rolling bearings.

The cementite has a Vickers hardness ($Hv$) of ca. 1,000–1,500 whereas $M_{23}C_6$-base alloy carbides have a hardness of 1,300–1,800. The very hardness of such carbides combines with the above-described refining effect of Mo and this would help extend the life of the rolling bearing.

It is essential for the purposes of the present invention to add Mo in an amount ranging from one third of the Cr addition to 2.0 wt %. In order to insure that the addition of Mo promotes the refining of carbides (inclusive of carbonitrides; the term "carbides" as it appears hereunder shall cover "carbonitrides"), Mo must be present in an amount of at least one third of the Cr addition. If this lower limit is not reached, the amount of Mo is so small relative to the Cr content that the carbide precipitate is refined only insufficiently to extend the life of the bearing by a desired degree. If the Mo content exceeds 2% in the presence of 3% Cr, unmelted macrocarbides such as MoC may possibly appear in the melting step; at the same time, the quenching temperature need be as high as 900° C. or above but this is not preferred from the viewpoint of production efficiency.

The alloy steel of which the rolling bearing is made must possess other characteristic values and their criticality is described below.

(i) The content of residual austenite ($\gamma_R$) in the rolling surface layer: 20–45 vol %

Foreign materials in the lubricant will produce an indentation on the rolling surface layer. Cracking that tends to develop at edges of the indentation is closely related to the residual austenite. The nature of the residual austenite varies somewhat with the carbon content of the starting feed of the steel but it is usually soft and viscous. Hence, by permitting the residual austenite to be present in the rolling surface layer in a desired proportion, the stress concentration at edges of the indentation can be reduced, thereby suppressing the occurrence of cracking. The residual austenite in the rolling surface layer has another effect: if a member that passes over the indentation during rolling (e.g., the races in relation to rollers) undergoes a certain number of passes that exceeds a predetermined value, the deforming energy that is exerted on the surface will cause martensite transformation, which hardens the rolling surface to thereby improve the life of the rolling bearing under lubrication in the presence of foreign matter. To insure that these effects are exhibited to the fullest extent, the residual austenite must be present in the rolling surface layer in an amount of 20–45 vol %.

If the content of residual austenite is less than 20 vol %, its effectiveness in reducing the stress concentration due to the occurrence of indentation by dust particles cannot be fully exhibited. If the content of residual austenite exceeds 45 vol %, its effectiveness in reducing the stress concentration is saturated and the surface hardness is reduced, rather than improved, whereby the fatigue resistance of the bearing is deteriorated. For these reasons, the content of residual austenite in the rolling surface layer must be in the range of 20–45 vol %, with the range of 25–40 vol % being preferred.

(ii) Average particle size of fine-grained carbides and/or carbonitrides in the rolling surface layer: 0.5–1.5 μm The surface hardness ($H_V$) decreases as the content of residual austenite ($\gamma_R$) in the rolling surface layer increases. Hence, the present invention enables the surface hardness of a rolling bearing to be improved relative to the amount of residual austenite by hardening due to the precipitation of fine-grained carbides or carbonitrides. To this end, the precipitated carbides or carbonitrides must have an average particle size of 0.5–1.5 μm. If their average particle size is less than 0.5 μm, the improvement in the life of the bearing is unsatisfactory and its wear resistance will decrease. If their average particle size exceeds 1.5 μm, the precipitated carbides or carbonitrides become the source of stress concentration and the chance of the development of cracking and flaking will increase to shorten the life of the rolling bearing.

The content of the fine-grained carbides and/or carbonitrides in the rolling surface layer is desirably in the range of 10–30% by area ratio. The area ratio is defined by a following equation:

(An area of the carbides which are disposed on a surface layer/an unit area)×100%, where the surface layer is within a range from a front surface to 0.2 mm in depth If the content of the carbides or carbonitrides is too small, the decrease in surface hardness in response to the increase in the content of residual austenite cannot be effectively compensated. If the content of the carbides or carbonitrides is too large, the carbides will become coarse; in addition, the amount of carbon that dissolves in the matrix will decrease to such a low level that the necessary amount of residual austenite cannot be assured. In this connection, it should be noted that the amount of the carbides or carbonitrides can be controlled by adjusting various factors such as the amount of carbide-forming elements and the tempering temperature.

The carbide-forming elements may be of any known types including Cr, Mo, V and W (W will also form nitrides). Carbonitrides are those which are formed by carbonitriding rather than carburization and they include the carbides mentioned above, as well as nitrides such as $Fe_3(CN)$.

Preferred carbide-forming elements include Cr and Mo. Chromium (Cr) improves the quenchability and tempering resistance of steels; it is also the carbide-forming element necessary to improve the hardness of alloy steels by precipitating fine-grained carbides. The Cr content suitable for refining the carbides that will be precipitated in the rolling surface layer is in the range of 1–3 wt %. Steels with a Cr content less than 1 wt % may be carburized or otherwise treated to increase the C content so as to enhance only the surface hardness; but then, carbide nucleation is limited and carbides tend to grow so fast as to produce macrocarbides. If the Cr content exceeds 3 wt %, macrocarbides will be crystallized already in the stage of starting feed for alloy steels and the life of the bearing will decrease on account of stress concentration. Needless to say, using more than the necessary amount of Cr is not economically advantageous. In addition, if one wants to refine macrocarbides, he has to perform a heat treatment, high-temperature quenching and other procedures for dissolving the carbides in the matrix and reprecipitating them and this only results in a lower efficiency of heat treatments.

The starting feed for alloy steels may be prepared not only by casting but also by a known technique of sintering powders. The sintering of powders is a preferred method since neither macrocarbides nor carbonitrides will be crystallized in the stage of sintered feed.

For the criticality of Mo, see the related description already made herein.

Other carbide-forming elements that can be used in the present invention include V ($\leq 7$ wt %, particularly $\leq 3$ wt %), W ($\leq 15.0$ wt %), or to improve a hardenability, Mn ($\leq 2$ wt %) and Ni ($\leq 3$ wt %) and one or more of these elements may be contained as required. If desired, annealing for spheroidization may be performed to precipitate fine-grained carbides.

(iii) Hardness (Hv) of the rolling surface layer in relation to its residual austenite content:

$$-4.7\times(\gamma_R \text{ vol }\%)+920 \leq H_V \leq -4.7\times(\gamma_R \text{ vol }\%)+1,020$$

In accordance with the present invention, the Vickers hardness of the rolling surface layer as it relates to various amounts of residual austenite is specified to lie within the range represented by the above formula. If the Vickers hardness of the rolling surface layer is less than the lower limit of the formula, the fatigue resistance of the bearing decreases and its life is shorted irrespective of whether lubrication is effected in the presence of foreign matter in the lubricant or under a clean condition. On the other hand, it is practically difficult to make the Vickers hardness of the rolling surface layer greater than the upper limit.

Alloy steels that can be used in the present invention include a case-hardening steel, a high-carbon chromium bearing steel and a high-speed steel for use in bearings at high temperature. The carbon content of these alloy steels is preferably in the range of 0.1–1.0 wt %. The lower limit of the carbon content is set at 0.1 wt % since it is difficult to further reduce the carbon content by the steel making technology available today. On the other hand, if the carbon content exceeds 1.2 wt %, macro-carbides tend to form already in the stage of starting feed and there is a high potential for the lowering of toughness and breaking strength. Hence, the upper limit of the carbon content of the alloy steel is preferably set to 1.2 wt %.

EXAMPLES

Examples of the present invention are described below.

Test samples made of steels having the compositions listed in Table 1 were heat-treated for carburization or carbonitriding.

TABLE 1

| Sample No. | Main Components (wt %) | | | | | Heat Treatment | Residual Austenite (%) | Surface Hardness (Hv) | Carbide Average Size (μm) | Carbide Maximum Size (μm) | Life $L_{10}$ (× $10^6$ cycles) | Mo/Cr |
|---|---|---|---|---|---|---|---|---|---|---|---|---|
| | C | Si | Mn | Cr | Mo | | | | | | | |
| Invention | | | | | | | | | | | | |
| 1 | 0.32 | 0.35 | 0.60 | 2.95 | 1.55 | Carbonitriding - Quenching - Tempering | 21 | 890 | 0.7 | 2.1 | 9.1 | 0.53 |
| 2 | 0.85 | 0.40 | 0.50 | 1.80 | 0.90 | Carbonitriding - Quenching - Tempering | 35 | 806 | 0.7 | 1.6 | 10.5 | 0.54 |
| 3 | 0.43 | 1.02 | 0.45 | 1.55 | 0.65 | Carbonitriding - Quenching - Tempering | 30 | 856 | 0.7 | 1.5 | 15.1 | 0.42 |
| 4 | 0.62 | 0.25 | 1.21 | 2.40 | 1.10 | Carbonitriding - Quenching - Tempering | 25 | 865 | 0.5 | 2.2 | 11.0 | 0.46 |
| 5 | 0.19 | 0.26 | 0.73 | 2.10 | 0.75 | Carbonitriding - Quenching - Tempering | 33 | 832 | 0.6 | 2.3 | 21.2 | 0.36 |
| Comparison | | | | | | | | | | | | |
| 6 | 0.42 | 0.25 | 1.09 | 2.71 | 0.36 | Carburizing - Quenching - Tempering | 27 | 806 | 0.8 | 8.6 | 5.0 | 0.13 |
| 7 | 0.35 | 0.30 | 0.61 | 1.56 | 0.36 | Carbonitriding - Quenching - Tempering | 28 | 795 | 0.7 | 6.8 | 4.1 | 0.23 |
| 8 | 0.20 | 0.28 | 0.65 | 2.41 | 0.42 | Carbonitriding - Quenching - Tempering | 26 | 801 | 1.2 | 7.5 | 3.9 | 0.17 |
| 9 | 0.62 | 0.25 | 0.63 | 2.17 | 0.30 | Carbonitriding - Quenching - Tempering | 35 | 758 | 1.4 | 6.3 | 3.6 | 0.14 |
| 10 | 0.36 | 0.25 | 0.45 | 2.99 | 0.50 | Carbonitriding - Quenching - Tempering | 20 | 855 | 0.7 | 6.5 | 5.1 | 0.167 |
| 11 | 0.42 | 0.25 | 1.09 | 2.71 | 0.36 | Carburizing - Quenching - Tempering | 25 | 783 | 2.2 | 10.5 | 1.5 | 0.13 |
| 12 | 0.42 | 0.25 | 1.09 | 2.71 | 0.36 | Carburizing - Quenching - Tempering | 30 | 689 | 0.2 | 12.5 | 1.6 | 0.13 |
| 13 | 0.42 | 0.25 | 1.09 | 2.71 | 0.36 | Carburizing - Quenching - Tempering | 33 | 724 | 2.9 | 7.8 | 2.1 | 0.13 |
| 14 | 0.42 | 0.25 | 1.09 | 2.71 | 0.36 | Carburizing - Quenching - Tempering | 38 | 671 | 0.4 | 9.0 | 1.7 | 0.13 |
| 15 | 0.42 | 0.25 | 1.09 | 2.71 | 0.36 | Carburizing - Quenching - Tempering | 46 | 687 | 1.3 | 9.6 | 3.0 | 0.13 |
| 16 | 0.30 | 0.28 | 0.61 | 1.35 | 0.01 | Carbonitriding - Quenching - Tempering | 14 | 760 | 1.2 | 2.5 | 1.0 | 0.0074 |
| 17 | 0.26 | 0.28 | 0.65 | 2.33 | 0.02 | Carbonitriding - Quenching - Tempering | 12 | 765 | 1.5 | 6.8 | 1.2 | 0.009 |
| 18 | 0.61 | 0.25 | 0.50 | 2.70 | 0.01 | Carbonitriding - Quenching - Tempering | 45 | 657 | 1.5 | 7.5 | 2.1 | 0.004 |
| 19 | 0.35 | 0.25 | 0.45 | 3.10 | 0.02 | Carbonitriding - Quenching - Tempering | 30 | 743 | 1.3 | 8.0 | 1.5 | 0.0065 |
| 20 | 0.38 | 0.27 | 0.46 | 2.86 | 2.05 | Carbonitriding - Quenching - Tempering | 22 | 905 | 0.8 | 5.9 | 6.2 | 0.72 |
| 21 | 0.41 | 0.25 | 0.51 | 0.92 | 1.08 | Carbonitriding - | 30 | 740 | 0.7 | 6.8 | 4.1 | 1.174 |

TABLE 1-continued

| Sample No. | Main Components (wt %) | | | | | Heat Treatment | Residual Austenite (%) | Surface Hardness (Hv) | Carbide Average Size (μm) | Carbide Maximum Size (μm) | Life L10 (× 10^6 cycles) | Mo/Cr |
| --- | --- | --- | --- | --- | --- | --- | --- | --- | --- | --- | --- | --- |
| | C | Si | Mn | Cr | Mo | | | | | | | |
| 22 | 0.42 | 0.26 | 0.63 | 0.83 | 2.5 | Quenching - Tempering Carbonitriding - Quenching - Tempering | 12 | 782 | 0.8 | 2.3 | 5.3 | 3.01 |

Of the two methods of heat treatment employed, direct quenching for carburization consisted of the following steps (see FIG. 1): heating in an (Rx gas+enriched gas) atmosphere at 920°–960° C. for ca. 3–5 h; air cooling to ambient temperature; oil quenching at 840° C.×1 h; and tempering at 180° C.×2 h. Carbonitriding consisted of the following steps (see FIG. 2): heating in an (Rx gas+enriched gas+5% ammonia gas) atmosphere at 880° C. for ca. 3–5 h; oil cooling to ambient temperature; the same subsequent treatments as in carburization.

The thus treated test samples were measured for the content of residual austenite, surface hardness, the average particle size of carbides and their maximum particle size. The average particle size of carbides is defined by a following equation:

$(d_{max}+d_{min}) \times \frac{1}{2}$, where $d_{max}$ means a maximum particle size and $d_{min}$ means a minimum particle size in the surface layer (which is within a range from a front surface to 0.2 mm in depth)

The residual austenite content was measured by X-ray analysis whereas the particle size of carbides was measured by a microscopic method.

The treated test samples were also shaped into disk-shaped specimens suitable for use not only as the inner race but also as the outer race of a rolling bearing and subjected to a thrust life test with a thrust bearing steel testing machine of the type described in "Tokushuko Binran (Handbook of Specialty Steels)", First Edition, compiled by Denki Seiko Kenkyusho, published by Rikogakusha, May 25, 1969, pp. 10–21. The testing conditions were as follows:

N=1,000 rpm
Pmax=500 kgf/mm$^2$
Lubricant=Turbine oil No. 68
Steel particles (Fe$_3$C with H$_v$ of 870 and a diameter of 74–147 μm) were added to the lubricant as dust particles in an amount of 300 ppm.

The point of time when cracking or flaking discernible with a microscope or the naked eye developed in 10% of the specimens of each test sample was designated the life ($L_{10}$ life) of that sample and the cumulative number of revolutions to that point was used as a quantitative means of expressing the life.

The test results are also shown in Table 1, in which sample Nos. 1–5 correspond to examples of the second aspect of the present invention, with the amounts of Cr and Mo addition being within the range specified by claim 1. Sample Nos. 6–19 are comparative samples; sample Nos. 6–10 were within the scope of the first aspect of the present invention but the amount of Mo addition was less than a third of the Cr addition and, hence, was smaller than the lower limit of the range specified by the present invention; the amount of Mo addition to sample Nos. 11–15 was also less than a third of the Cr addition and their surface hardness was outside the scope of the present invention; sample Nos. 16–19 were outside the scope of the present invention in terms of any of the Mo addition, the residual austenite content and the surface hardness. In the sample No. 20, Mo in the main components is more than 2 wt %.

As is clear from Table 1, sample Nos. 1–5 prepared in accordance with the second aspect of the present invention were equivalent to one another in that the particle size of carbides, in particular, their maximum size, was noticeably smaller than in the case of the comparative samples, and the effectiveness of Mo in extending the life of bearing was marked.

Sample Nos. 6–10, which are in a range of the subject matter of U.S. Ser. No. 699,901 that are not of a prior art, were comparable to sample Nos. 1–5 of the present invention as regards the average particle size of carbides but their maximum particle size was considerably larger than that of sample Nos. 1–5. Their life was no longer than one half to a third of the life of sample Nos. 1–5. Comparative sample Nos. 11–15 varied greatly in the average particle size of carbides and their maximum particle size was also much greater than in the case of sample Nos. 1–5. The life of comparative sample Nos. 11–15 was even shorter than that of sample Nos. 6–10. Comparative sample Nos. 16–19 had such a tendency that the maximum particle size of carbides was smaller than that of sample Nos. 11–15 and yet the average particle size of carbides in sample Nos. 16–19 was fairly large and those samples had the shortest life. Comparative sample No. 20, wherein the content of Mo is more than 2.0 wt %, formed MoC so that a carbide of extremely large particle size which is immiscible in the matrix was easily formed, thereby its life was shorter. Comparative sample No. 21, wherein the content of Cr is less than 1.0 wt %, Cr easily form a carbide of extremely large particle size with the carton atom. Further, since the content of Cr which is an element to form carbides is small, Comparative Sample No. 21 was inferior in the surface hardness, so that its life was shorter. In the Comparative sample No. 22 wherein the content of Mo is more than 2.0 wt %, the content of MoC is increased, so that the content of C which is immiscible in the matrix is decreased, thereby its residual austenite content is reduced. Accordingly, its life was shorter.

As examples of the present invention, only sample Nos. 1–5 made of steels having the compositions listed in Table 1 were used but these are given merely for an illustrative purpose and steels of other compositions may be used.

In the examples of the present invention, gas carburization was performed but this is not the sole case of the invention and ion carburization may be adopted as a carburization technique.

As described on the foregoing pages, the present invention promotes the refining of carbide particles by controlling the amount of Mo addition to be within the specified range in relation to the amount of Cr addition.

This offers the advantage of providing a rolling bearing that has a long life even if it is used for lubrication in the presence of foreign materials.

Concrete Examples

As conducive to a full understanding of the third aspect of the invention, concrete examples of the rolling bearing according to the invention and comparison examples will be described.

A steel material having a composition as indicated in the following Table 2 was subjected to carbonitriding, and then to hardening and tempering, to form a test piece having an amount of residual austenite ($\gamma_R$ vol %) of 32 to 36%, and a hardness (Hv) of 753 to 760 (hereinafter referred to as "an "A" steel", when applicable).

TABLE 2

| Composition | C | Si | Mn | P | S | Ni | Cr | Mo | Cu |
|---|---|---|---|---|---|---|---|---|---|
| wt % | 0.42 | 0.41 | 0.77 | 0.012 | 0.007 | 0.08 | 1.53 | 0.9 | 0.11 |

| | Composition | Ti | (O) |
|---|---|---|---|
| | ppm | 30 | 7 |

Next, inner races, outer races, and rolling elements, which were made of steels indicated in the following Table 3 were combined as shown in Table 3 to form deep groove ball bearings; i.e., first through third concrete examples, and first through eighth comparison examples. The service lives of the deep groove ball bearings thus formed were tested with a service life testing machine of a ball bearing lubricant immersing type produced by NSK LTD under the following test conditions:

Test Conditions:
P/C=0.32 (P is the equivalent load, and C is the fundamental load rating)
Speed N=3000 rpm
Foreign matters mixed in,
  Hardness=Hv 540
  Diameter=74 to 147 μm
  Mixing rate=1000 ppm
Oil bath lubrication (Lubricant; turbine VG68)

The bearing lives were represented by the periods of time which were obtained as follows: Ten bearings were tested per test condition, and the "10% life" (a period of time in which 10% of the bearings are broken, on the short life side) thereof was obtained according to Weibull distribution function.

The data $\Delta H_R C$ were obtained for the roller bearings in each of which the amount of residual austenite ($\gamma_R$ vol %) of the inner or outer race was in a range of from 25 to 40 vol %, and the surface hardness (Hv) thereof satisfied the following condition:

$$-4.7 \times (\gamma_R \text{ vol } \%) + 900 \leq Hv \leq -4.7 \times (\gamma_R \text{ vol } \%) + 1000$$

The data $\Delta H_R C$ were calculated from the following expression:

(hardness of the rolling element)−(hardness of the inner and outer race made of the "A" steel)

The results of life tests are as indicated in Table 3.

TABLE 3

| Sample No. | | Steel | $\gamma_R$ (vol %) | Surface hardness (Hv) | $\Delta H_R C$ | Bearing life (time) |
|---|---|---|---|---|---|---|
| Concrete example | | | | | | |
| 1 | Inner race | "A" steel | 32 | 760 | 1 | 141 |
| | Outer race | SUJ2 | 9 | 746 | — | |
| | Rolling element | SUJ2 | 11 | 787 | — | |
| 2 | Inner race | "A" steel | 32 | 760 | 2 | 136 |
| | Outer race | SUJ2 | 9 | 746 | — | |
| | Rolling element | SUJ2 | 12 | 816 | — | |
| 3 | Inner race | "A" steel | 32 | 760 | 1 | 145 |
| | Outer race | "A" steel | 36 | 753 | 1 | |
| | Rolling element | SUJ2 | 11 | 787 | — | |
| Comparison example | | | | | | |
| 1 | Inner race | "A" steel | 32 | 760 | −1 | 53 |
| | Outer race | SUJ2 | 9 | 746 | — | |
| | Rolling element | SUJ2 | 7 | 731 | — | |
| 2 | Inner race | "A" steel | 32 | 760 | 0 | 64 |
| | Outer race | "A" steel | 36 | 753 | 0 | |
| | Rolling element | SUJ2 | 9 | 756 | — | |
| 3 | Inner race | SUJ2 | 9 | 746 | — | 20 |
| | Outer race | "A" steel | 36 | 753 | 1 | |
| | Rolling element | SUJ2 | 7 | 731 | — | |
| 4 | Inner race | SUJ2 | 9 | 746 | — | 40 |
| | Outer race | SUJ2 | 9 | 746 | — | |
| | Rolling element | "A" steel | 33 | 758 | — | |
| 5 | Inner race | SUJ2 | 9 | 746 | — | 38 |
| | Outer race | "A" steel | 36 | 753 | 0 | |
| | Rolling element | "A" steel | 33 | 758 | — | |
| 6 | Inner race | SUJ2 | 9 | 746 | — | 16 |
| | Outer race | SUJ2 | 9 | 746 | — | |
| | Rolling element | SUJ2 | 12 | 800 | — | |
| 7 | Inner race | "A" steel | 32 | 760 | 0 | 151 |
| | Outer race | SUJ2 | 9 | 746 | — | |
| | Rolling element | "A" steel | 33 | 758 | — | |
| 8 | Inner race | "A" steel | 32 | 760 | 0 | 155 |

TABLE 3-continued

| Sample No. | Steel | | $\gamma_R$ (vol %) | Surface hardness (Hv) | $\Delta H_R C$ | Bearing life (time) |
| --- | --- | --- | --- | --- | --- | --- |
| | Outer race | "A" steel | 36 | 753 | 0 | |
| | Rolling element | "A" steel | 33 | 758 | — | |

As is apparent from Table 3, in each of the first through third concrete examples, the amount of residual austenite ($\gamma_R$ vol %) of the inner race or the inner and outer races was in the range of 25 to 40 vol %, and the surface hardness (Hv) satisfied the condition $[-4.7\times(\gamma_R \text{ vol } \%)+900 \leq Hv \leq -4.7\times(\gamma_R \text{ vol } \%)+1000]$, and the hardness of the rolling element was higher by at least $H_R C$ 1 than the hardness of the inner and outer races. That is, the first through third concrete examples were in the scope of claim of this invention. The first through third concrete examples were high in service life, although the steel SUJ2 was employed which was heat-treated normally. Thus, the first through third concrete examples satisfied the above-described conditions, and the rolling elements which are rather difficult to subject to a high level heat treatment such as carburizing or carbonitriding were obtained through a simple heat treatment. Hence, the first through third concrete examples are advantageous in that the bearings can be manufactured at low cost and are high in service life.

In each of the first and second comparison, the amount of residual austenite ($\gamma_R$ vol %) of the inner race or the inner and outer races was in the range of 25 to 40 vol %, and the surface hardness (Hv) thereof satisfied the condition $[-4.7\times(\gamma_R \text{ vol } \%)+900 \leq Hv \leq -4.7\times(\gamma_R \text{ vol } \%)+1000]$. However, the hardness of the rolling elements combined with the inner race or the inner and outer races was smaller than or equal to the hardness of the inner race or the inner and outer races. Therefore, the rolling elements were not so improved in service life as expected. That is, the first and second comparison examples were not so improved in bearing life as the first through third concrete examples.

In the third comparison example, the amount of residual austenite ($\gamma_R$ vol %) of the outer race was in the range of 25 to 40 vol %, and the surface hardness (Hv) thereof satisfied the condition $[-4.7\times(\gamma_R \text{ vol } \%)+900 \leq Hv \leq -4.7\times(\gamma_R \text{ vol } \%)+1000]$, and the hardness of the rolling elements was higher at least by $H_R C$ 1. However, the inner race is smaller than the outer race in a diameter and is higher than the outer race in a contact pressure, so that the inner race is lowest in durability. The inner race did not satisfy the conditions, and therefore it was impossible to increase the durability of the inner race. Thus, the bearing life was short.

In the fourth comparison example, the amount of residual austenite ($\gamma_R$ vol %) of the rolling elements was in the range of 25 to 40 vol %, and the surface hardness (Hv) thereof satisfied the condition $[-4.7\times(\gamma_R \text{ vol } \%)+900 \leq Hv \leq -4.7\times(\gamma_R \text{ vol } \%)+1000]$. However, the inner race which is lowest in durability did not meet the conditions, and therefore it was impossible to increase the durability of the inner race. Thus, the bearing life was relatively short.

In the fifth comparison example, the amounts of residual austenite ($\gamma_R$ vol %) of the outer races and the rolling elements were in the range of 25 to 40 vol %, and the surface hardness (Hv) thereof satisfied the condition $[-4.7\times(\gamma_R \text{ vol } \%)+900 \leq Hv \leq -4.7\times(\gamma_R \text{ vol } \%)+1000]$. However, the inner race which is lowest in durability did not meet the conditions, and therefore it was impossible to increase the durability of the inner race. Thus, the bearing life was relatively short.

The sixth comparison example was a conventional bearing in which the inner race, the outer race and the rolling elements were made of steel SUJ2. The sixth comparison example was short in service life.

In each of the seventh and eighth comparison examples, the amounts of residual austenite ($\gamma_R$ vol %) of the inner race, and outer races, and the rolling elements were in the range of 25 to 40 vol %, and the surface hardness (Hv) thereof satisfied the condition $[-4.7\times(\gamma_R \text{ vol } \%)+900 \leq Hv \leq -4.7\times(\gamma_R \text{ vol } \%)+1000]$, and the service life was relatively long. However, the seventh and eighth comparison examples, when compared with the first through third concrete examples, are disadvantageous in that, since the rolling elements were made of the "A" steel heat-treated specially, the manufacture was intricate, and accordingly the resultant bearing was high in manufacturing cost.

Figure 2:
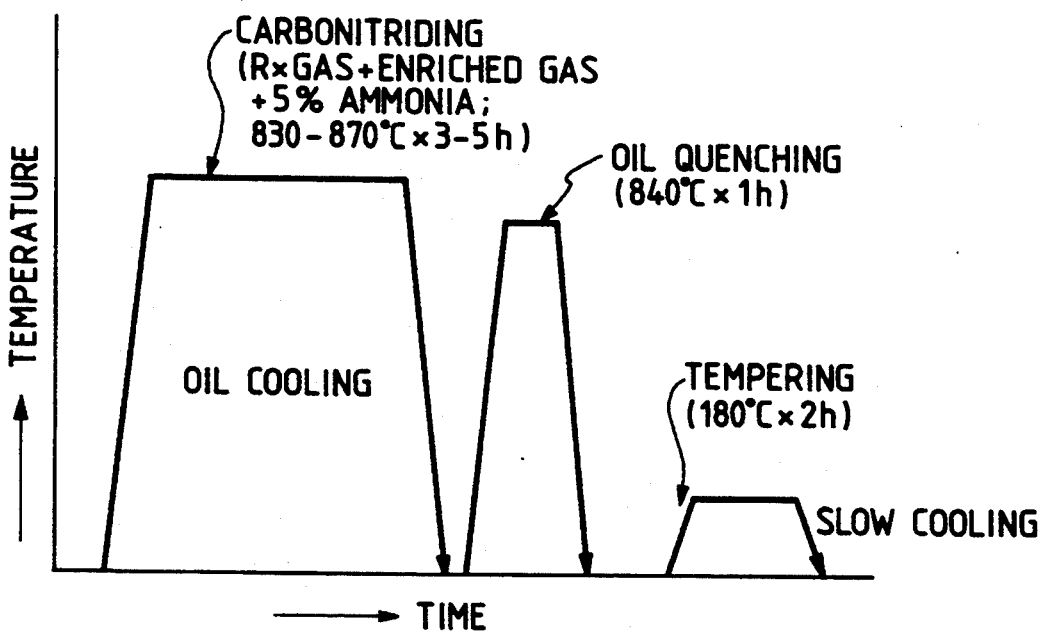
FIG. 2 is a diagram showing the sequence of steps for producing the rolling bearing of the present invention, together with the conditions of heat treatments for carbonitridation.
Figure 3:
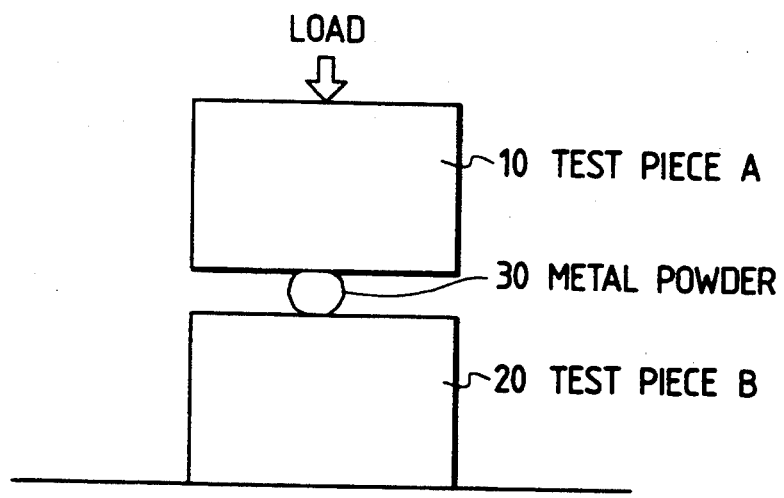
FIG. 3 is an explanatory diagram for a description of a test method of forming an indentation in a test piece.
Figure 4:
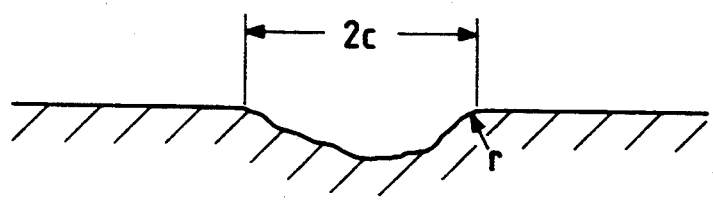
FIG. 4 is a sectional view showing an indentation formed in a steel material employed in the invention.

Next, test pieces A having surface hardness as indicated in the following Table 4 were combined with test pieces B having amounts of residual austenite ($\gamma_R$ vol %) and surface hardness indicated in the same Table 4. More specifically, as shown in FIG. 1, each test piece A 10 was set over each test piece B 20 with metal powder 30 (corresponding to the foreign matters) therebetween, and the diameter of an indentation formed in the test piece A 10 was measured under the following test conditions:

Test conditions
  Metal powder; Hv 490
    Diameter=100 μm
    Material=SUS420JI
    Load=500 kgf The results of test are as indicated in Table 4, in which $\Delta H_R$=(hardness of test piece A)−(hardness of test piece B), and 2CA is the diameter (μm) of an indentation in the test piece A.

TABLE 4

| | Test Piece B | |
| --- | --- | --- |
| | $\gamma_R$ = 9 vol % $H_R C63$ $Hv 742$ | $\gamma_R$ = 32 vol % $H_R C63$ $Hv 773$ |
| Test Piece A | | |
| $H_R C61$ | $\Delta H_R C = -1$ | $\Delta H_R C = -2$ |
| ($Hv 722$) | $2CA = 183$ μm | $2CA = 175$ μm |
| $H_R C62$ | $\Delta H_R C = 0$ | $\Delta H_R C = -1$ |
| ($Hv 745$) | $2CA = 154$ μm | $2CA = 165$ μm |
| $H_R C63$ | $\Delta H_R C = 1$ | $\Delta H_R C = 0$ |
| ($Hv 770$) | $2CA = 148$ μm | $2CA = 152$ μm |
| $H_R C64$ | $\Delta H_R C = 2$ | $\Delta H_R C = 1$ |
| ($Hv 802$) | $2CA = 146$ μm | $2CA = 101$ μm |
| $H_R C65$ | $\Delta H_R C = 3$ | $\Delta H_R C = 2$ |
| ($Hv 834$) | $2CA = 148$ μm | $2CA = 98$ μm |

In the Table 4, a value of the C-scale of Rockwell Hardness (HRC) is caluculated and converted from the Vickers Hardness (Hv).

It was confirmed from Table 4 that, in the combinations of the test pieces A and B in each of which the hardness of the test piece A was larger by to $H_RC$ 1 or more and smaller by $H_RC$ 2 or less than the hardness of the test piece B, and the amount of residual austenite ($\gamma_R$ vol %) was in the range of 25 to 40 vol %, the diameter of the indentation was small, and the concentration of stress at the edge of the indentation was lessened, and the service live was high.

However, in the present invention, a high-carbon chromium steel can be utilized as a material of which the rolling element are made.

As was described above, in the rolling bearing of the invention, the amount of residual austenite ($\gamma_R$ vol %) in the surface layer of at least one of the inner and outer races is in a range of 25 to 40 vol %, and the surface hardness (Hv) thereof meets the following condition:

$$-4.7 \times (\gamma_R \text{ vol \%}) + 900 \leq Hv \leq -4.7 \times (\gamma_R \text{ vol \%}) + 1000$$

and the hardness of the rolling elements combined with the inner and outer races is higher by $H_RC$ 1 to 2 than that of the one of the inner and outer races. Therefore, as for the rolling elements, it is unnecessary to employ a high level of heat treatment such as carburizing or carbonitriding which requires a long period of time to achieve. The rolling element is sufficiently long in service life even when used with a lubricant containing foreign matters. Thus, the rolling bearing of the invention is low in manufacturing cost and long in service life.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A rolling bearing comprising a race and a roller, at least one of said race and said roller essentially consisting of an alloy steel which contains 0.1–1.2% by weight C, 1–3% by weight Cr and 0.33–2.0% by weight Mo, at least one of said race and said roller has being subjected to carburizing, quenching and tempering or carbonitriding, quenching and tempering to form a rolling surface, wherein said rolling surface has a residual austenite content ($\gamma_R$) which is 20%–40% by volume, a maximum particle size of at least one of fine grain carbides and carbonitrides being not more than about 2.3 μm, and wherein Cr is contained in an amount ranging no more than three times as much as the Mo content by weight.

2. A rolling bearing as claimed in claim 1 wherein said rolling surface has the following range of Vickers hardness (Hv) in relation to the residual austenite content:

$$-4.7 \times (\gamma_R \text{ vol \%}) + 920 \leq Hv \leq -4.7 \times (\gamma_R \text{ vol \%}) + 1020.$$

3. A rolling bearing according to claim 2, wherein an average particle size of said least one of fine-grained carbides and carbonitrides is in the range of 0.5–1.5 μm.

4. A rolling bearing according to claim 2, wherein said rolling surface has a content of at least one of fine-grained carbides and carbonitrides in the surface layer of said rolling surface is in the range of 10–30% by area.

5. A rolling bearing according to claim 1, wherein an average particle size of said least one of fine-grained carbides and carbonitrides is in the range of 0.5–1.5 μm.

6. A rolling bearing according to claim 1, wherein said rolling surface has a content of at least one of fine-grained carbides and carbonitrides in the surface layer of said rolling surface is in the range of 10–30% by area.

7. A rolling bearing according to claim 1, wherein that said rolling elements are made of a high-carbon chromium steel.

8. A rolling bearing comprising track rings, namely, inner and outer races, and rolling elements set between said inner and outer races, wherein the amount of residual austenite ($\gamma_R$ vol %) in the surface layer of at least one of said inner and outer races is in a range of 25 to 40 vol %, and the surface hardness (Hv) thereof meets the following condition:

$$-4.7 \times (\gamma_R \text{ vol \%}) + 900 \leq Hv \leq -4.7 \times (\gamma_R \text{ vol \%}) + 1000$$

and the hardness of said rolling elements is higher by $H_RC$ of 1 to 2 than that of said one of the inner and outer races.

* * * * *